United States Patent
Thurston, III et al.

(10) Patent No.: US 9,554,020 B2
(45) Date of Patent: Jan. 24, 2017

(54) WORKFLOW FOR CONTENT CREATION AND GUIDED DISPLAY MANAGEMENT OF EDR VIDEO

(71) Applicant: DOLBY LABORATORIES LICENSING CORPORATION, San Francisco, CA (US)

(72) Inventors: Kimball D. Thurston, III, Los Angeles, CA (US); James E. Crenshaw, Burbank, CA (US); Robin Atkins, Campbell, CA (US); Tao Chen, Palo Alto, CA (US); Timo Kunkel, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/894,153

(22) PCT Filed: Nov. 10, 2014

(86) PCT No.: PCT/US2014/064854
§ 371 (c)(1),
(2) Date: Nov. 25, 2015

(87) PCT Pub. No.: WO2015/073377
PCT Pub. Date: May 21, 2015

(65) Prior Publication Data
US 2016/0248939 A1   Aug. 25, 2016

Related U.S. Application Data

(60) Provisional application No. 61/903,778, filed on Nov. 13, 2013.

(51) Int. Cl.
G09G 5/02   (2006.01)
G06T 5/00   (2006.01)
(Continued)

(52) U.S. Cl.
CPC .............. *H04N 1/603* (2013.01); *G06T 5/007* (2013.01); *G06T 5/50* (2013.01); *H04N 2201/326* (2013.01)

(58) Field of Classification Search
CPC combination set(s) only.
See application file for complete search history.

(56) References Cited

U.S. PATENT DOCUMENTS 6,719,392 B2   4/2004   Qiao
7,933,445 B2   4/2011   Pan
(Continued)

FOREIGN PATENT DOCUMENTS

WO   2012/125802   9/2012
WO   2012/127401   9/2012
(Continued)

OTHER PUBLICATIONS

Tremeau, et al "Color in Image and Video Processing: Most Recent Trends and Future Research Directions" EURASIP Journal on Image and Video Processing, publisher: Springer Science and Business Media, 2008.

*Primary Examiner* — Wesner Sajous
(74) *Attorney, Agent, or Firm* — Konstantinos Konstantinides

(57) ABSTRACT

Video data with enhanced dynamic range (EDR) are color graded for a first and a second reference display with different dynamic range characteristics to generate a first color-graded output, a second color graded output, and associated first and second sets of metadata. The first color-graded output and the two sets of metadata are transmitted from an encoder to a decoder to be displayed on a target display which may be different than the second reference display. At the receiver, a decoder interpolates between the first and second set of metadata to generate a third set of metadata which drives the display management process for
(Continued)

displaying the received video data onto the target display. The second set of metadata of metadata may be represented as delta metadata values from the first set of metadata values.

18 Claims, 4 Drawing Sheets

(51) Int. Cl.
*G06T 5/50* (2006.01)
*H04N 1/60* (2006.01)
*H04N 9/73* (2006.01)

(56) References Cited

U.S. PATENT DOCUMENTS

| | | | |
|---|---|---|---|
| 8,767,004 B2 | 7/2014 | Longhurst | |
| 8,928,686 B2 | 1/2015 | Messmer | |
| 8,934,726 B2 | 1/2015 | Margerm | |
| 9,024,961 B2 | 5/2015 | Longhurst | |
| 9,042,682 B2 | 5/2015 | Atkins | |
| 9,100,660 B2 | 8/2015 | Su | |
| 2007/0109447 A1 | 5/2007 | Yamashita | |
| 2007/0165048 A1 | 7/2007 | Yamashita | |
| 2008/0195977 A1 | 8/2008 | Carroll | |
| 2010/0091039 A1 | 4/2010 | Marcu | |
| 2010/0128055 A1 | 5/2010 | Blonde | |
| 2010/0289810 A1 | 11/2010 | Doser | |
| 2011/0096249 A1 | 4/2011 | Belik | |
| 2011/0154426 A1 | 6/2011 | Doser | |
| 2012/0229495 A1* | 9/2012 | Longhurst | H04N 1/6058 345/590 |
| 2013/0038790 A1 | 2/2013 | Seetzen | |
| 2013/0050245 A1 | 2/2013 | Longhurst | |
| 2013/0088644 A1 | 4/2013 | Atkins | |
| 2013/0114000 A1 | 5/2013 | Atkins | |
| 2013/0120656 A1 | 5/2013 | Wilson | |
| 2013/0156334 A1* | 6/2013 | Margerm | H04N 19/117 382/233 |
| 2013/0163868 A1 | 6/2013 | Wang | |
| 2013/0177066 A1 | 7/2013 | Ye | |
| 2013/0293774 A1 | 11/2013 | Elliott | |
| 2014/0002478 A1 | 1/2014 | Ballestad | |
| 2014/0078165 A1* | 3/2014 | Messmer | H04N 1/603 345/589 |
| 2015/0007243 A1* | 1/2015 | Kunkel | H04N 21/23432 725/116 |
| 2015/0103091 A1* | 4/2015 | Messmer | H04N 1/6058 345/590 |
| 2015/0358646 A1* | 12/2015 | Mertens | H04N 1/6058 382/166 |

FOREIGN PATENT DOCUMENTS

| | | |
|---|---|---|
| WO | 2013/046095 | 4/2013 |
| WO | 2013/046096 | 4/2013 |
| WO | 2013/086169 | 6/2013 |
| WO | 2014/130343 | 8/2014 |
| WO | 2013/144809 | 2/2015 |
| WO | 2015/017314 | 2/2015 |

* cited by examiner

WORKFLOW FOR CONTENT CREATION AND GUIDED DISPLAY MANAGEMENT OF EDR VIDEO

CROSS-REFERENCE TO RELATED APPLICATIONS

This application claims the benefit of priority from U.S. Provisional Patent Application Ser. No. 61/903,778, filed on Nov. 13, 2013, which is hereby incorporated by reference in its entirety.

TECHNOLOGY

The present invention relates generally to video images. More particularly, an embodiment of the present invention relates to a workflow for content creation and guided display management of video with enhanced or high dynamic range.

BACKGROUND

As used herein, the term 'dynamic range' (DR) may relate to a capability of the human psychovisual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is simultaneously perceivable by a HVS. As used herein, EDR may relate to a DR that spans 5 to 6 orders of magnitude. Thus while perhaps somewhat narrower in relation to true scene referred HDR, EDR nonetheless represents a wide DR breadth.

Most consumer desktop displays support luminance of 200 to 300 cd/m$^2$ or nits. Most consumer HDTVs range from 300 to 1000 cd/m$^2$. Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more).

As appreciated by the inventors here, due to the broad range of supported dynamic ranges in display devices (e.g., from as low as 50 nits for today's cinema projectors to 5,000 nits or more for future EDR televisions), improved techniques for the workflow and distribution of EDR signals and related metadata for the proper display management of EDR video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
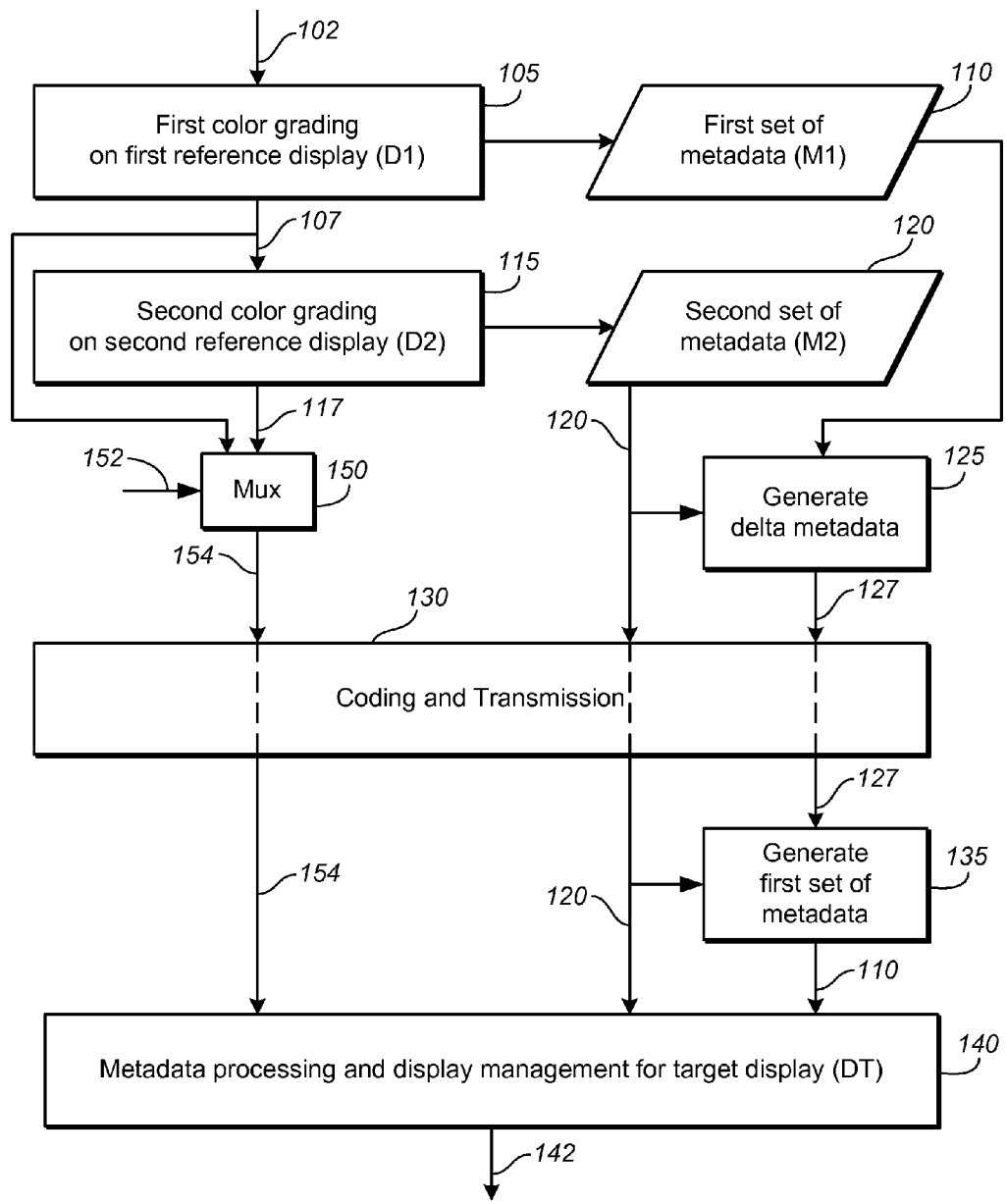
FIG. 1 depicts an example workflow for color grading, distributing, and displaying EDR video signals according to an embodiment of the present invention.

Methods and systems for the workflow for content creation and guided display management of EDR signals are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the workflow for the content creation, distribution, and guided display management of video signals with high or enhanced dynamic range. Video data with enhanced dynamic range (EDR) are color-graded for a first and a second reference display with different dynamic range characteristics to generate a first color-graded output, a second color graded output, and associated first and second sets of metadata. The first color-graded output and the two sets of metadata are transmitted from an encoder to a decoder to be displayed on a target display which may be different than the second reference display. At the receiver, a decoder interpolates between the first and second set of metadata to generate a third set of metadata which drives the display management process for displaying the received video data onto the target display.

In an embodiment, the second set of metadata may be coded and transmitted as delta metadata representing the difference between the first and the second set of metadata.

In an embodiment, the second set of metadata may be transformed into a fourth set of metadata before being transmitted to the receiver.

In the receiver, the interpolation between the two sets of metadata may be linear or nonlinear.

In an embodiment, instead of interpolating a third set of metadata, the receiver may generate a mapping function based on the two sets of metadata and the parameters of the target display.

In an embodiment, the mapping function to map the received image data to the target display may be interpolated from separate mapping functions generated from the two sets of metadata and the parameters of the target display.

EDR Content Creation Workflow

Overview

During the content creation process, given a "master" source (e.g., a movie), it is not unusual to generate multiple variations of the master targeting different markets and different playback environments. For example, a studio may generate three versions of a movie: a cinema version, for movie theater projectors, a standard-definition version, for DVD distribution, and a high-definition version, for Blu-Ray distribution. These versions may use different resolutions and different video compression schemes; however, in most cases, they all need to conform to the original artistic intent of the director.

As the content creation and display management workflow migrates from today's relatively low dynamic ranges to enhanced or high dynamic ranges, the wide range of brightness and color reproduction capabilities among legacy and future displays poses a challenge for any studio (or content creator in general) who wishes to preserve the director's intent in a consistent manner across all viewers. A poor reproduction can be very distracting and detrimental. Unfortunately, today's broadcasting standards, such as ITU-R Recommendation BT. 709, provide only limited support for the proper display management of video signals.

To address these problems, FIG. 1 depicts an example workflow for color grading, distributing, and guided display management of video signals according to an embodiment of the present invention. As depicted in FIG. 1, given raw EDR video data (102), a colorist creates using a first reference display (D1) a first color-graded version (107) that matches the director's intent. In an embodiment, the first reference display may have the best possible display capabilities in terms of black and white levels (e.g., dynamic range) and color gamut. As a byproduct of the first color grading (105), a first set of video metadata (M1) (110) is also generated. As defined herein, the term "metadata" or 'ancillary data" may relate to any auxiliary information that is transmitted as part of the coded bit-stream and may assist a downstream device (e.g., a receiver or a decoder) to render a decoded image. Such metadata may include, but are not limited to, information as: color space or gamut information, dynamic range information (e.g., minimum, mid-tones, and maximum luminance values), tone mapping information, or other display or content-related information (e.g., display characteristics and ambient light during color grading). In an embodiment, metadata of interest may include luminance intensity and chroma-intensity related parameters, such as: lift, gain, and gamma, overall color saturation, and luma-dependent color saturation. These metadata may be characterize each frame or a collection of frames, such as a scene or "shot" of the video data (102), where, as defined here, the term "scene" may relate to a series of consecutive frames in the video signal sharing similar color and dynamic range characteristics.

Given the first color graded output (107), a colorist may perform a "trim-pass" (115) to generate a second color graded version (117) for a second reference display (D2). This step, as will be described in more detail later, may be automatic or semi-automatic, and will generate a second set of metadata (M2) (120). The second reference display will have dynamic range characteristics that are typically lower than those of the first reference display.

In prior art, the second color graded version (117) together with the second set of metadata (120) may be coded in a format suitable for either storage onto distribution media (e.g., a DVD) or for direct transmission to viewers. Hence, upon receiving and decoding of the coded video data and the metadata, receivers may apply a display management process (140) to generate a final output (142) for a target display (DT) based only the second color graded version (117) and the second set of metadata (120).

As depicted in FIG. 1, and as it will be described in further detail later on in other embodiments, in an embodiment of the present invention, an encoder may select to transmit the first color graded version (107) instead of the second color graded version. Furthermore, a representation (127) of the first set of metadata (110) may be transmitted together with the video data (154) and the second set of metadata (120) to further guide the display management process (140) on the receiver. In an embodiment, the first set of metadata (110) may be coded as delta metadata (127), representing the difference between the first set and the second set of metadata. These delta metadata, together with the received video data (154) and the second set of metadata (120) allow a receiver (140) to generate far more accurate display data (142) regardless of how far apart are the dynamic range characteristics between the second reference display and the target display.

In another embodiment the first set of metadata may be transmitted without transmitting any delta metadata.

In another embodiment (not shown), the delta metadata (127) may be generated directly as part of the trim-pass process (115). Then, the second set of metadata (120) is generated by combining the first set of metadata with the delta metadata, as done in step (135) in the receiver.

In another embodiment, the first set of metadata is transmitted as is and the second set of metadata is transmitted as delta metadata over the first set of metadata. Furthermore, in some embodiments, additional sets of metadata may be available, each one generated from an additional color-graded pass using a different display. For example, a particular scene (or even the whole movie), may be graded for displays with maximum brightness at 100 nits, a 1,000 nits or a 2,000 nits.

Color Grading Workflow Example

In an example workflow, consider a first reference display with maximum brightness of 4,000 nits and minimum brightness of 0.005 nits. For a second reference display, consider, a typical SDR television set, one with maximum brightness of 100 nits and the same minimum brightness of 0.005 nits. In this example, without limitation, it is assumed that both displays have similar color gamuts.

Consider an indoor scene during the day, where a person's face is in front of a window with blinds on it. On the first reference display, the colorist can allow the daylight behind the blinds to be quite bright, while allowing the blinds to be noticeably darker, and yet still leave the face at a level that is natural. On the second reference display, the colorist will be forced to reduce the level of the daylight by a large amount (because the maximum brightness is much lower), and then, to maintain some of the difference between the outside and the blinds, other levels will be reduced. However, this step may push the brightness level of the face down as well, which will look darker. Then, to adjust the face color, the colorist may bring the mid-tones up.

In a receiver, if only the second set of metadata is available, a target display with characteristics very close to the characteristics of the second display will render a proper output; however, other displays with better dynamic range characteristics, perhaps with dynamic range in between the ranges of the first and second reference displays, will most likely render the face too bright.

In the current invention, metadata related to both sets of metadata are retained, hence target displays can render more accurate renditions, regardless of how close or far apart are their specifications compared to the second reference display. For example, display management processes should maintain the proper mid-tones for the face while boosting the brightness of the bright regions.

Example Embodiments for Metadata Processing

Figure 2A:
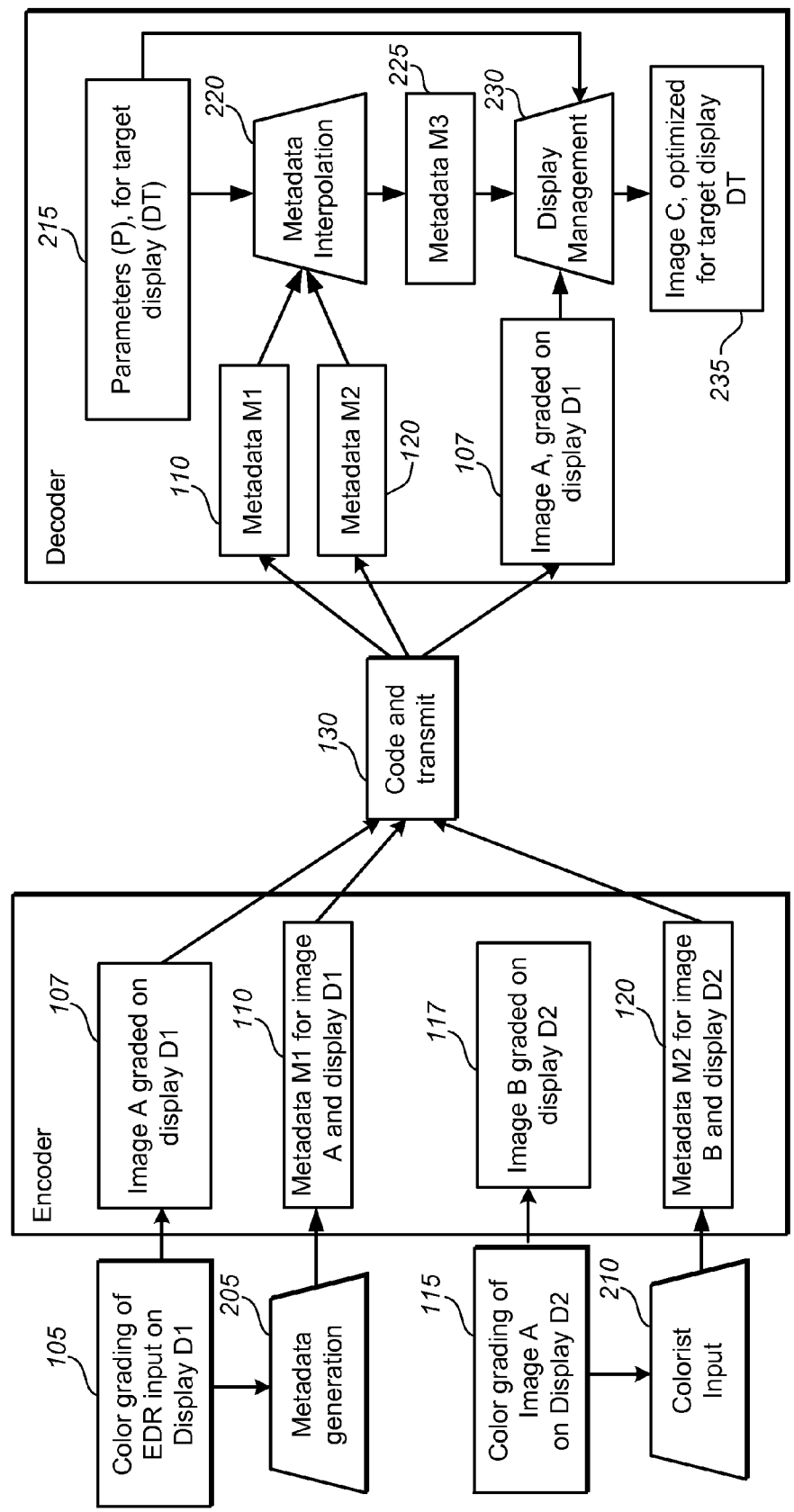
FIGS. 2A-2C depict example workflows for color grading, distributing, and displaying EDR video signals according to embodiments of the present invention.

FIG. 2A depicts an example workflow for color grading, distributing, and displaying EDR video signals according to an embodiment of the present invention. Similarly to the workflow depicted in FIG. 1, EDR-generated master content (e.g. 102) is color graded first on reference display D1 to generate color-graded image A (107). To support multiple distribution formats and displays, image A may also be color graded for one or more other reference displays. Color grading of image A on display D2 will generate image B (117). As part of the color grading process on display D1, metadata M1 (110) related to the color-graded data A and the display are also generated.

Color grading (115) on the second reference display (D2) is typically called a trim pass. It is typically semi-automated, with some correction input (210) from a colorist. For example, in an embodiment, color graded image B may represent the output of a display management process for display D2 with inputs the image data A and metadata M1. An example display management process for EDR video data is described in U.S. Provisional Application 61/810, 104, from now to be referred as the '104 application, filed on Apr. 9, 2013, and titled "Display management for high dynamic range video," which is incorporated herein by reference in its entirety.

Corrections by the colorist will result on new metadata M2 (120) that can be used to override what the display management process decided to do from just the M1 metadata. For many scenes, M2 metadata may be the same as in M1 because there were no corrections by the colorist.

According to this embodiment, an encoder packs and transmits to a receiver the first color graded image (A, 107), the first metadata M1 (110), and the second metadata M2 (120). As described earlier, either set of metadata may be transmitted with reference to the other set and a set of delta metadata.

In a receiver, the decoder has access to the following data: the first color graded image (A, 107), the two sets of metadata (110) and (120), and a set of display parameters (P, 215) for a target display (DT). Using these data, the receiver must generate a new image (C, 235) which when it is displayed on display DT, it preserves the director's intent, as expressed by the color grading processes (105) and (115) in the encoder.

As described in the '104 application, during the display management process (e.g., 230), a non-linear mapping process may be applied to map the intensity (I) of the received signal (e.g., 107) to intensity values that fit within the constraints of the target display DT. The target display may be an EDR display or an SDR display. If the target display has the same characteristics as the reference production display used to generate signal (107), then no transformation is required; However, if the target display has a dynamic range that is lower or higher than the dynamic range of the reference production display, then a mapping process maps the dynamic range of the input signal to the dynamic range of the target display.

An example non-linear mapping transform is described in the '104 application and also by A. Ballestad et al., in PCT application with Ser. No. PCT/US2012/029189, filed on Mar. 15, 2012, titled "Method and apparatus for image data transformation," which is incorporated herein by reference in its entirety. According to the Ballestad '189 PCT application, an example transfer function for non-linear mapping may be denoted as $$Y_{out} = \left( \frac{C_1 + C_2 Y_{in}^n}{1 + C_3 Y_{in}^n} \right)^m, \quad (1)$$

where $C_1$, $C_2$, and $C_3$ are constants, $Y_{in}$ is the input value for a color channel (e.g., the I channel), $Y_{out}$ is the output value for the color channel, and n and m are parameters that determine the slope and the rolls-off of the function. This transfer function is an example of a parameterized sigmoidal tone curve function. Parameters $C_1$, $C_2$, and $C_3$ are determined based on the definition of three anchor points, which in turn may be defined based on the brightness characteristics of the reference (or source) display—typically extracted from input metadata—, and the brightness characteristics of the target display (e.g., 215), which are typically already known to the processor performing the display management process.

The characteristics of each tone-mapping curve may be adapted on a per scene or per frame basis. Given the broad range of possible displays (e.g., from 50 nits digital cinema projectors to 10,000 nits displays of the future), each of the received set of metadata (110 and 120) on their own may not be able to provide adequate or accurate information to allow the display management process (230) to generate optimized tone-mapping curves. In an embodiment, a new metadata interpolation step (220) may be used to combine the M1 metadata (110) and the M2 metadata (120) to generate a new set of metadata, M3 (225).

In an embodiment, metadata interpolation processing (220) may be based on the assumption that the tone-mapping curve characteristics for any target display (DT) are presumed to be on a curve defined by the corresponding characteristics of the first reference display (D1) and the second reference display (D2). For example, using information related to the parameters for the target display (215) and the viewing environment (e.g., the brightness of ambient light, 2D versus 3D viewing, and the like), in an embodiment, the M3 metadata (225) for the target display may be generated by using a linear interpolation model to interpolate between the known first and second set of metadata.

For example, denote as Smin, Smax, and Smid the M1 metadata, representing the minimum, maximum, and mid-tones values in a scene. Denote as Tmin, Tmax, and Tmid the corresponding M2 metadata for the same scene. Let Nmin, Nmax, and Nmid represent the corresponding output values in the M3 metadata, then in an embodiment the M3 metadata may be computed as:

$Nmin=(1-a)Smin+a\ Tmin,$ $Nmax=(1-b)Smin+b\ Tmin$ $Nmid=(1-c)Smin+c\ Tmin \quad (2)$ where a, b, and c are constants between 0 and 1. Constants a, b, and c may all be the same, or different. For example, each constant may be generated based on a function of known display parameters, e.g., a=Tpeak/Npeak, where Tpeak denotes the peak brightness of the second display (D2) and Npeak denotes the peak brightness of the target display (DT). Alternative functions may also be applied to determine these constants.

In other embodiments, a non-linear interpolation model (e.g., one based on the perceptual characteristics of the human visual system) may be used, since it is expected that target displays with high peak luminance will require far less adjustment than displays with low peak luminance. Such linear or non-linear interpolation may be applied to a variety of metadata values, such as: peak brightness values, minimum brightness values, mid-tone values, and the like.

For example, using the same notation as before, for computing Nmin (but can be repeated for other metadata values as well), let $$\text{delta}=T\text{min}-S\text{min},$$

$$\text{ratio}=T\text{peak}/N\text{peak},$$

$$\text{falloff}=2,$$

$$\text{scalefactor}=\text{ratio}^{\text{falloff}},$$

$$N\text{min}=S\text{min}+\text{scalefacto}*\text{delta}, \quad (3)$$

hence, as the target display gets brighter, the effect of the M2 metadata (e.g., Tmin) falls off non-linearly. The falloff factor may be adjusted depending on the brightness and black level characteristics of the trim-pass display (e.g., D2). Practitioners skilled in the art will appreciate that alternative interpolation functions may also be used in this step.

Some embodiments may combine linear and non-linear models to generate piece-wise linear or non-linear interpolation functions. For example, for an input range of 100-200 nits a decoder may use a first interpolation function, but for an input range of 200.1 nits to 400 nits, the decoder may use a second interpolation function. Furthermore, the first interpolation function may be based on metadata sets M1 and M2, but the second interpolation function may be based on other metadata, e.g., M1 and M2', where the M2' metadata were generated during the color grading of image A on a third reference display (D3). In case additional sets of metadata related to color-grade passes are received from an encoder, those metadata can be also used to improve the accuracy of the interpolation process.

Returning to FIG. 2A, after generating metadata M3 (225), display management process (230), may generate image C (235) using: the computed M3 metadata (225), the target display parameters (215), and the received image data A (107).

In another embodiment, interpolation may not be applied directly to the two sets of metadata but to the anchor points or other display-management related parameters generated by the metadata. For example, one may generate two separate mapping functions using the two sets of metadata and the target display parameters, and then create the final mapping function by interpolating between the two functions.

In some embodiments, in place of or in addition to metadata interpolation, pixel data interpolation may also be applied. For example, display management process (230) may generate first and second output images using separately the first set and the second set of metadata. Then, a final output image may be generated by interpolating between the pixel values of the first and second output images.

In some embodiments, color-grading tools may allow a colorist to manually adjust and export the optimum mapping curve for mapping color-graded image A to the second reference display. That curve may be sent to the decoder as part of the M2 metadata and may be used as a basis to interpolate the optimal mapping curve for the target display.

The set of controls commonly used by color artists or graders is often called Lift/Gain/Gamma (LGG) and Hue and Saturation (HS). Lift changes the darkness, gain changes the brightness, and gamma changes the mid-tones.

Given input x, and lift (L), gain (G), and gamma parameters, the LGG-corrected output y is given by $$y=G\cdot(x+L\cdot(1-x))^{gamma}.$$

Figure 2B:
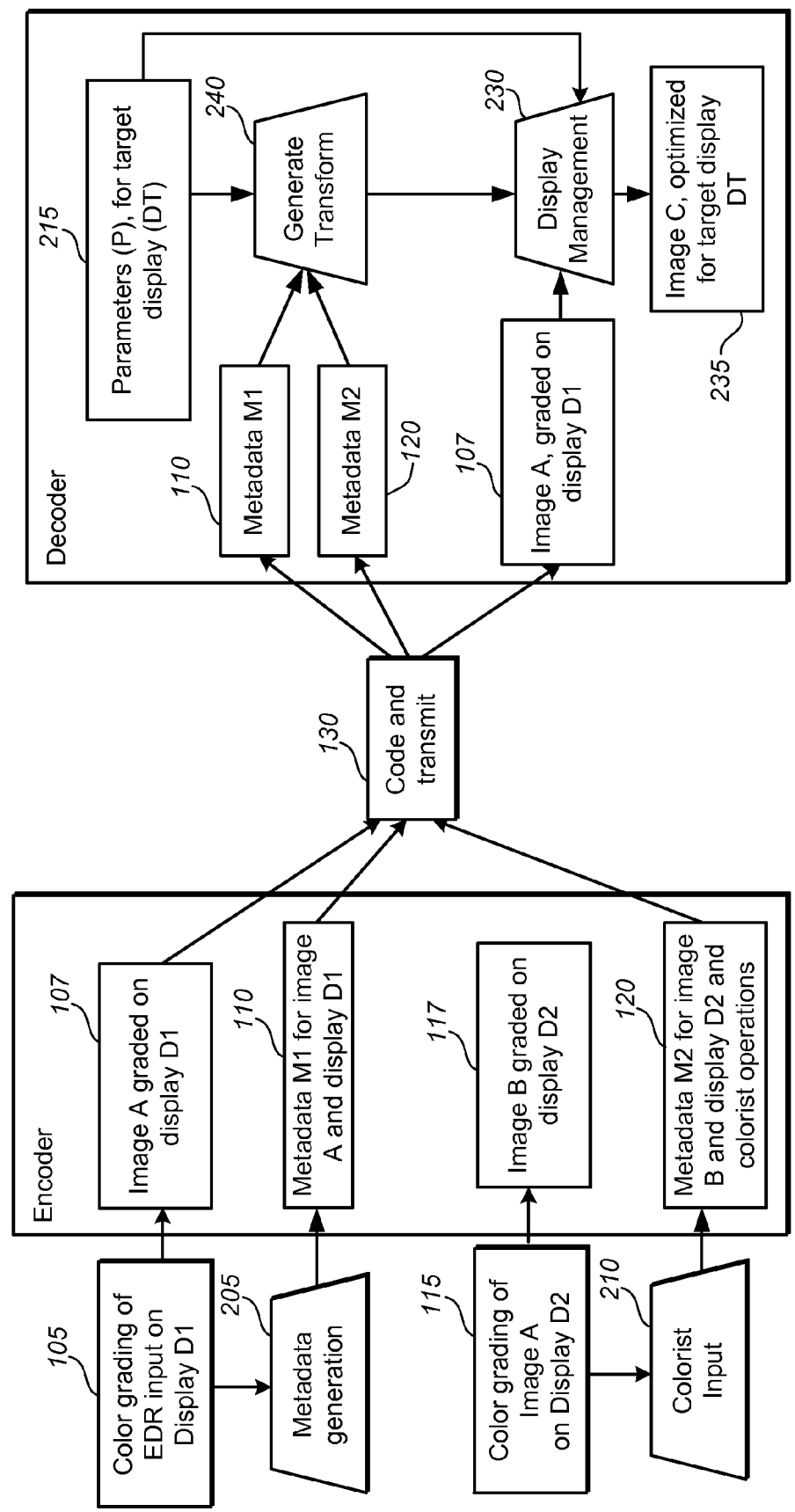

In an embodiment, as depicted in FIG. 2B, LGG values entered by the colorist during the trim pass (115), may be captured and recorded as part of the second set of metadata (120). Similarly, additional local operations by the colorist, such as "power windows," may also be captured and transmitted to the decoder. Because of the additional information, in the decoder, the display management process may change to take advantage of the new data. For example, as depicted in FIG. 2B, a transform generation unit (240), may now use the two sets of metadata (M1 110, M2 120) and the parameters of the target display (215) to generate the mapping transform that maps color-graded image data A (107) to image C on display DT. Given, the mapping function, the rest of the display management process (230) proceeds as discussed earlier.

To support a variety of downstream devices, each with distinct processing capabilities, in an embodiment, metadata may be packetized and transmitted at different levels of hierarchy. For example, Level 0 metadata may simply include a description of the source display, such as min, max, and mid values of brightness Level 1 metadata may include metadata related to the content (e.g., min, max, and mid values for a scene, a frame, or picture region of interest);

Level 2 metadata may include metadata related to a trim pass on a reference display (e.g., gain, lift, and gamma values);

Level 3 metadata may include data related to a trim-pass to another display; and Additional levels of metadata, as will be discussed later in further detail, may include data related to transformations of the original content metadata data or explicit mapping functions in case the encoder knows already the characteristics of the target display (e.g., in over the top transmission)

Denote as $Y_O=f_m(Y_I)$ the mapping function to map EDR input data (e.g., $Y_I$=A, 107), color graded for a high-end reference display (e.g., D1), to display data for a target display with a different dynamic range (e.g., $Y_O$=C, 235). For example, $f_m(Y_I)$ may be based on equation (1). In an embodiment, LGG data may be used to adjust the output of the $f_m(Y_I)$ mapping. For example, given input data $Y_A$, the display data $Y_C$ may be derived as:

$$Y_T=f_m(Y_A)$$

$$Y_C=f_{LGG}(Y_T), \quad (4)$$

where $f_{LGG}(\ )$ denotes a function of the input LGG parameters, and $Y_T$ denotes intermediate image data. For example, in an embodiment, given gain (G), gamma, and lift (L) inputs, $f_{LGG}(\ )$ may be expressed as $$Y_{out} = G\ Y_{in}^{gamma} + L. \qquad (5)$$

Figure 2C:
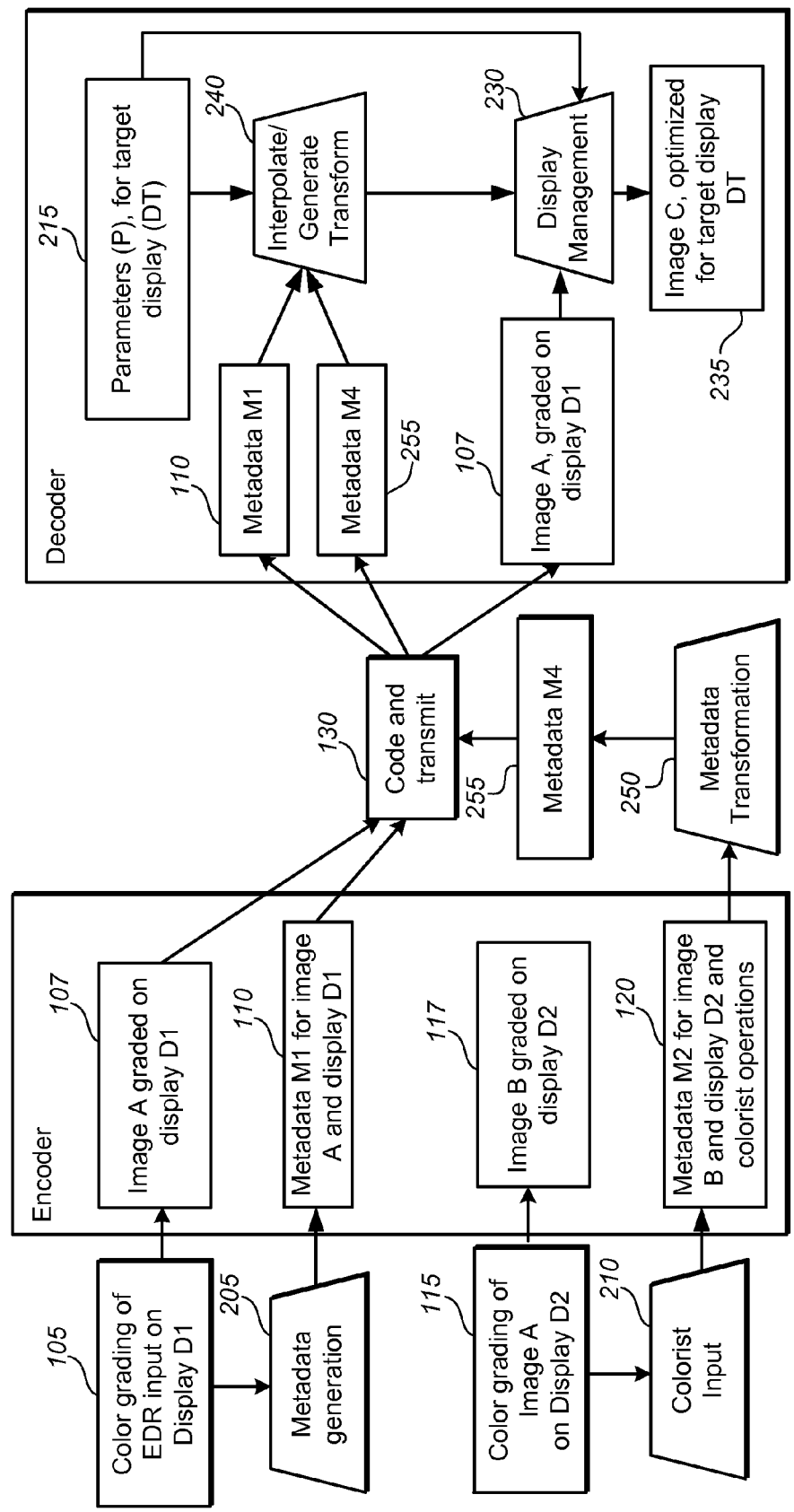

Not all decoders may have the processing power to accommodate the computational requirements of the generate transform step (240); hence, in an embodiment, as depicted in FIG. 2C, the encoder may add a new metadata transformation step (250) that performs some of the operations otherwise would be performed by the decoder's generate transform step (240). For example, in an embodiment, given the second set of metadata (120) (e.g., mid, max, min and LGG values), a new set of metadata (M4, 255) (e.g., mid', max', min', and power-slope) may be generated for the second reference display and transmitted to the decoder in place of the original M2 metadata.

For example, given the metadata M2, which include min, mid, and max values, and may also include lift/gain/gamma data from the colorist, the encoder may apply equations (4) to generate a mapping function of equation (1) (or a corresponding look-up table) that maps how color-graded image A is mapped to color-graded image B for display D2, as in $$Y_T = f_m(Y_A),$$
$$Y_B = f_{LGG}(Y_T), \qquad (6)$$

As will be appreciated by those skilled in the art, in some embodiments, mapping functions as those described by equations (1) to (6) may be implemented by using look-up tables or other equivalent means.

Given $f_m(\ )$, consider now adjusting one or more of its parameters (e.g., m in equation (1)) by one or more offset parameters (e.g., $m'=\alpha+m$), to generate a new mapping function $f_{m'}(\ )$. In the encoder, a computer may run a minimization algorithm, for instance the Levenberg_Marquart algorithm, to find new min', mid', max', and $\alpha$ values so that $Y_B = f_{m'}(Y_A)$ will be as close as possible to $Y_B$, say according to a distance criterion (e.g., minimizing the mean least-squares error). Thus, metadata M4 may now include the new min', mid', and max' values. Metadata M4 may also include a parameterized definition of $f_{m'}(\ )$ (e.g., $C_1, C_2, C_3$, n, and m').

In other embodiments, the parameter $\alpha$ may be associated with other parameters of the mapping function (e.g., $C_1, C_2$, or $C_3$), for example, to minimize the processing requirements on the decoder during the generate transform step (240).

In an embodiment, metadata M4 may be generated directly during the trim-pass process (115).

On the decoder side, given metadata M1 and M4, the decoder may apply any of the techniques discussed previously to generate the mapping function to map image data A (107) into the target display (DT). For example, it may apply metadata interpolation between metadata M1 and M4 to generate a new set of metadata (M5) and then generate a mapping function, or it may directly interpolate a mapping function using metadata M1 and M4.

In certain broadcasting scenarios, such as transmitting over the top using the Internet, it may be possible for the transmitting server to know the target display characteristics (215) before transmission (130), but after the color grading operations (105, 115). Then, in an embodiment, part of the decoding steps, such as metadata interpolation (220) and generate transform (240) may be performed in the encoder itself. Then, instead of transmitting metadata M1 and M2, the encoder may transmit directly metadata M3 or the optimized mapping function needed to generate image C on the target display.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the workflow for content creation and display management of video with enhanced or high dynamic range, such as those described herein. The computer and/or IC may compute any of a variety of parameters or values that relate to the workflow for content creation and display management of video with enhanced or high dynamic range described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to the workflow for content creation and display management of EDR video as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the workflow for content creation and display management of EDR are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for guiding the display management of enhanced dynamic range (EDR) images in a video sequence, the method comprising, in a decoder:
   receiving a first set of metadata for a first image color graded on a first reference video display;
   receiving a set of delta metadata for a second image color graded on a second reference video display, wherein the first and second images represent the same scene;
   generating a second set of metadata for the second image color graded on the second reference display, using the first set of metadata and the delta metadata;
   receiving image data for the first image;
   accessing a set of parameters for a target video display;
   interpolating a third set of metadata using the first set of metadata, the second set of metadata, and the parameters of the target display; and
   mapping the image data for the first image into the target display using the image data, the third set of metadata, and the parameters for the target display;
   wherein the method is performed by one or more computing devices.

2. The method of claim 1, wherein the first reference display has a higher dynamic range than the second reference display.

3. The method of claim 1, wherein the first set of metadata comprises display parameters related to the dynamic range of the first reference display and the second set of metadata comprises display parameters related to the dynamic range of the second reference display.

4. The method of claim 1, wherein the first set of metadata comprises minimum, maximum, and mid-tones values for the first image.

5. The method of claim 1, wherein the second set of metadata comprises minimum, maximum, and mid-tones values for the second image.

6. The method of claim 1, wherein the second set of metadata comprises data related to ambient-light conditions when generating the second image data.

7. The method of claim 1, where the interpolation step between two metadata values is described by $$Nv=(1-a)Sv+a\ Tv,$$

where Nv is the interpolated value, Sv is a metadata value in the first set of metadata, Tv is a metadata value in the second set of metadata, and a is a constant.

8. The method of claim 7, wherein the interpolation constant a is determined as a function of the peak brightness of the second display and the target display.

9. The method of claim 1, where the interpolation step between two metadata values is described by $$Nv=Sv+R_{peak}{}^{f}(Tv-Sv),$$

where Nv is the interpolated value, Sv is a metadata value in the first set of metadata, Tv is a metadata value in the second set of metadata, $f$ is a roll-off factor, and $R_{peak}$ is a function of the peak brightness values of the target display and the second display.

10. The method of claim 9, wherein $R_{peak}$ is based on the ratio of the peak brightness of the second display over the peak brightness of the target display.

11. The method of claim 5, wherein the second set of metadata further comprises lift, gain, and gamma values for the second image.

12. A method for guiding the display management of enhanced dynamic range (EDR) images in a video sequence, the method comprising, in a decoder:
    accessing a first set of metadata (110) for a first image color graded on a first reference video display;
    accessing a fourth set of metadata (255) for a second image color graded on a second reference video display, wherein the first and second images represent the same scene;
    receiving image data (107) for the first image;
    accessing a set of parameters (215) for a target video display;
    generating a mapping function (240) using the first set of metadata, the fourth set of metadata, and the parameters of the target display; and
    mapping (230) the image data for the first image into the target display using the image data, the generated mapping function, and the parameters for the target display,
    wherein the fourth set of metadata is generated by an encoder and transmitted to the decoder,
    wherein generating the fourth set of metadata in the encoder comprises:
       generating (120) a second set of metadata for the second image color graded on the second reference display; and
       applying a metadata transformation (250) to the second set of metadata to generate the fourth set of metadata;
    wherein the method is performed by one or more computing devices.

13. The method of claim 12 wherein generating the mapping function comprises:
    generating a first mapping function using the first set of metadata and the parameters of the target display;
    generating a second mapping function using the fourth set of metadata and the parameters of the target display; and
    generating the mapping function by interpolating between the first and second mapping functions.

14. The method of claim 13, wherein the second mapping function is generated in response to both min, max, mid brightness values and lift, gain, and gamma values in the fourth set of metadata.

15. The method of claim 1, wherein the target display is different than the first reference display or the second reference display.

16. The method of claim 1, wherein the target display is different than the first reference display and the second reference display.

17. An apparatus comprising a processor and configured to perform the method recited in claim 1.

18. A non-transitory computer-readable storage medium having stored thereon computer-executable instructions for executing a method with a computer in accordance with claim 1.

* * * * *